Figure 1:
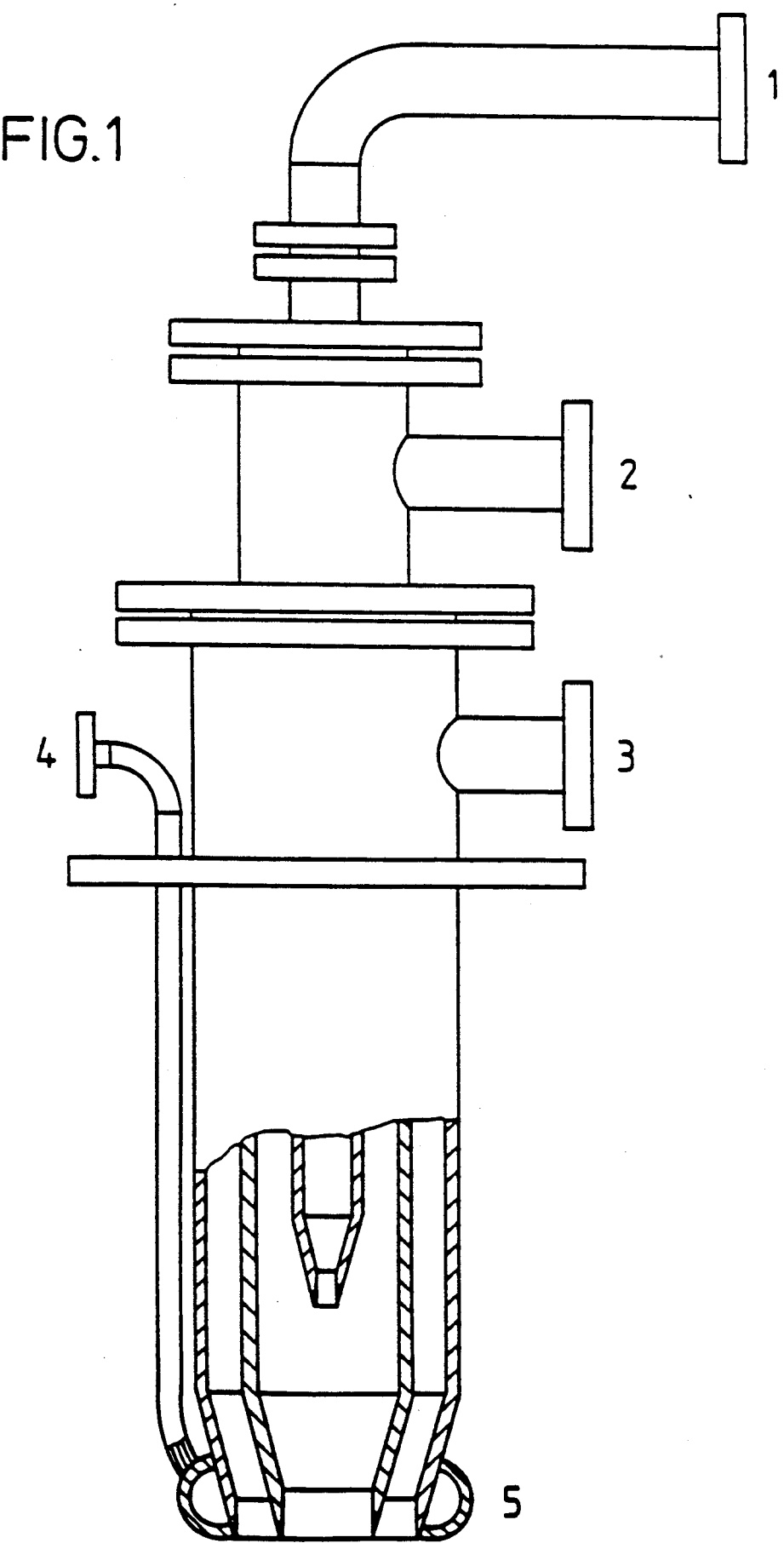

United States Patent [19]

Lueth et al.

[11] Patent Number: 4,999,029

[45] Date of Patent: Mar. 12, 1991

[54] PREPARATION OF SYNTHESIS GAS BY PARTIAL OXIDATION

[75] Inventors: Gero Lueth, Mannheim; Rolf Becker, Weinheim; Robert K. Horn, Ludwigshafen; Uwe Kempe, Dannstadt-Schauernheim; Wolfgang Vodrazka, Freinsheim, all of Fed. Rep. of Germany

[73] Assignee: Pasf Aktiengesellschaft, Ludwigshafen, Fed. Rep. of Germany

[21] Appl. No.: 462,000

[22] Filed: Jan. 8, 1990

[30] Foreign Application Priority Data

Jan. 31, 1989 [DE] Fed. Rep. of Germany ....... 3902773

[51] Int. Cl.$^5$ ............................................... C10J 3/16
[52] U.S. Cl. .................................... 48/197 R; 48/206; 48/212; 48/215; 252/373
[58] Field of Search ...................... 48/197 R, 212, 215, 48/206; 252/373

[56] References Cited

U.S. PATENT DOCUMENTS

| | | | |
|---|---|---|---|
| 2,776,195 | 1/1957 | Wessolek | 202/373 |
| 2,928,460 | 3/1960 | Eastman et al. | 252/373 |
| 3,528,930 | 9/1970 | Schlinger et al. | 48/215 |
| 3,743,606 | 7/1973 | Marian et al. | 48/215 |
| 3,847,564 | 11/1974 | Marian et al. | 48/215 |
| 3,945,942 | 3/1976 | Marion et al. | 48/215 |
| 3,951,617 | 3/1976 | Crouch . | |
| 3,972,690 | 8/1976 | Van Os | 48/212 |
| 3,980,590 | 11/1976 | Marion . | |
| 3,980,591 | 6/1976 | Marion . | |
| 3,980,592 | 4/1976 | Marion . | |

Primary Examiner—Peter Kratz
Attorney, Agent, or Firm—John H. Shurtleff

[57] ABSTRACT

Synthesis gases are prepared by partial autothermal oxidation of liquid fuels and/or solid fuels in the presence of oxygen or oxygen-containing gases with the addition of a temperature moderator, such as steam and/or $CO_2$, in an empty reactor space without baffles, at from 1000° to 1500° C. under from 1 to 100 bar, the reactants fuel and oxygen-containing gas being fed separately to the reactor, by a process in which the steam or $CO_2$ is fed in simultaneously with the feed of the fuel, and the steam is let down through one or more nozzles into the fuel steam directly before the orifice for the fuel, let-down being effected at from 30 to 250%, preferably from 80 to 140%, of the critical pressure ratio. An apparatus for carrying out the process is also described.

8 Claims, 2 Drawing Sheets

PREPARATION OF SYNTHESIS GAS BY PARTIAL OXIDATION

It is known that synthesis gas, which contains CO, $H_2$, $H_2O$ and $CH_4$ and may contain $N_2$, can be prepared by partial oxidation of liquid hydrocarbons, very finely milled solid fuels or mixtures of the two in the presence of oxygen or oxygen-containing gases, such as air or oxygen-enriched air.

Occasionally, in addition to the production of CO and $H_2O$, it is also desirable to form methane (U.S. Pat. No. 3,951,617), in order to obtain gases having a higher calorific value. In processes controlled in this way, a particularly large amount of carbon black is obtained owing to the low temperatures required.

The known processes operate as a rule under from 1 to 100, preferably from 30 to 80, bar, the fuel being reacted with oxygen or an oxygen-containing gas, in an empty, lined reactor without baffles, to give a gas mixture consisting of a plurality of components. In general, the mixture contains $CO_2$, CO, $CH_4$, COS, $H_2O$, $H_2S$, $H_2$ and $N_2$. In addition, depending on the number of carbon atoms in the fuels used, increasing amounts of carbon black or coke are formed, which have to be separated off from the cleavage gas by expensive processes (e.g. U.S. Pat. Nos. 3,980,590, 3,980,591 and 3,980,592) and may have to be recycled to the process. Where the fuels have a high ash content, some of the resulting carbon black or coke must always be removed. Recycling with the fuel used may lead to an undesirable accumulation of slag in the reaction space.

The process, in which the liquid fuel is sprayed via a single-material nozzle under high pressure into the oxygen/steam stream, has the disadvantage that the nozzle size, nozzle pressure and oil viscosity (oil temperature) have to be adapted to one another in order to ensure an optimum distribution of the fuel in the oxygen/steam stream. For a given nozzle, only small changes in load are possible. As a rule, operation at part load necessitates a nozzle change, which entails a shutdown Furthermore, the fine nozzle channels are very sensitive to relatively coarse solid particles in the oil. Blockages lead to non-uniform combustion, which may occasionally lead to rupture of the reactor wall and gas blow-outs.

The known industrial processes differ in general in the method of carbon black removal and working up and/or in the feed of the reaction products to the reactor.

We have found that the disadvantages of the known processes using fuels having a high ash content are avoided if, in the preparation of synthesis gases by partial autothermal oxidation of liquid fuels and/or solid fuels in the presence of oxygen or oxygen-containing gases with the addition of a temperature moderator, such as steam and/or $CO_2$, in a reaction space without baffles at from 1000° to 1500° C. under from 1 to 100 bar, the reactants fuel and oxygen-containing gas being fed separately to the reactor, the steam and/or $CO_2$ is or are fed in simultaneously with the fuel, and the steam is let down through one or more nozzles into the fuel stream, directly before the orifice for the fuel, let-down being effected at from 30 to 250%, preferably from 80 to 140%, of the critical pressure ratio.

Let-down is preferably effected at from 80 to 140% of the critical pressure ratio. The critical pressure ratio is obtained when the nozzle pressure is equal to $$\left(\frac{2}{X+1}\right) - \left(\frac{X}{X-1}\right)$$

times the reactor pressure, where X is the adiabatic exponent.

For example, if X=1.3, the initial nozzle pressure is 1.83 times the reactor pressure.

The present invention furthermore relates to an apparatus for carrying out the process, consisting of an empty reactor which is free of baffles, having a three-stream burner with in each case one or more separate feeds for fuel (2) and oxygen (3) to the water-cooled burner mouth (5) and parallel feed of steam and/or carbon dioxide, the pipe for the steam (1) being laid concentrically inside the pipe for the fuel, and the steam being let down into the oil through a central nozzle which ends flush with the orifice of the fuel pipe or up to 5 times the diameter of the fuel pipe, in the direction of flow, before the said orifice, and a cooling water feed (4).

According to the invention, when a gas having a high oxygen content and liquid hydrocarbons are used, a temperature moderator is added in an amount which limits the temperature to about 1300–1500° C., i.e. the temperature range in which the highest conversion rates are achieved. If methane formation is to be promoted, the temperatures must be reduced to about 1000–1200° C. In general, steam is used as the moderator, in an amount of from 0.05 to 0.08, preferably from 0.2 to 0.4, times (w/w) the amount of fuel. However, it is also possible to use $CO_2$ if a CO-rich gas is desired, in which case the amounts may occasionally also be increased and the $CO_2$ recycled after scrubbing of the cleavage gas.

According to the invention, steam is predominantly used as the moderator. The novel process constitutes a novel method for introducing liquid fuels and suspensions of solid fuels in liquid fuels or in water into the reaction space and controlling the reaction in an optimum manner.

In the novel process, in which fuel and oxygen and steam or $CO_2$ are fed into the reaction space through a three-stream burner (FIG. 1), the stated disadvantages are not encountered since the load can be varied within a wide range, starting from the maximum load. Where two-stream burners are used, dispersion of the liquid fuel with the moderating steam may also be effected outside the reactor, before the burner, in a mixer. Downstream of the mixer, the oil/steam mixture can be fed to the burner through the pipe, and emerges through the annular gap and mixes with the oxygen in the reactor, with further dispersion of the oil. The load can be reduced to about 60%. In spite of this wide load range of the burner, however, the quality of gasification depends on the load in this process too, as shown in Examples 2 and 3.

The equilibrium concentration (G in FIG. 2) of $CO_2$ in the presence of carbon at 1350° C. and 40 bar total pressure of 45% of CO is about 0.5% of $CO_2$ in the cleavage gas. The effective $CO_2$ content in the cleavage gas at a certain carbon black concentration in the cleavage gas, expressed in kg of carbon black per 100 g of fuel, is a measure of the approach to equilibrium and hence of the conversion in the gasification reaction.

On the other hand, a small amount of carbon black for a given $CO_2$ content in the cleavage gas means that the gasification conditions are advantageous.

In the graph (FIG. 2), in which the amount of carbon black obtained is plotted in kg of carbon black/ 100 kg of oil along the ordinate and the $CO_2$ content is plotted along the abscissa, the quality of gasification is clearly shown. Values denoting the same quality of gasification lie along a hyperbola whose vertical branch approximates to the $CO_2$ equilibrium content in the cleavage gas while the horizontal branch approximates to the abscissa axis. If carbon is no longer present, $CO_2$ can no longer be converted into CO. The closer the vertex of the hyperbola approaches the point of intersection of the $CO_2$ equilibrium concentration and the abscissa axis, the better the quality of gasification and the smaller the gasification losses of carbon black and $CO_2$. Higher $CO_2$ values in the cleavage gas can be obtained by a greater amount of moderating steam coupled with higher specific oxygen. The lowest $CO_2$ contents are achieved with very little moderating steam, for example $\leq 0.2$ t of steam/t of fuel. Thus, the amount of carbon black obtained increases for a given quality of gasification.

Figure 2:
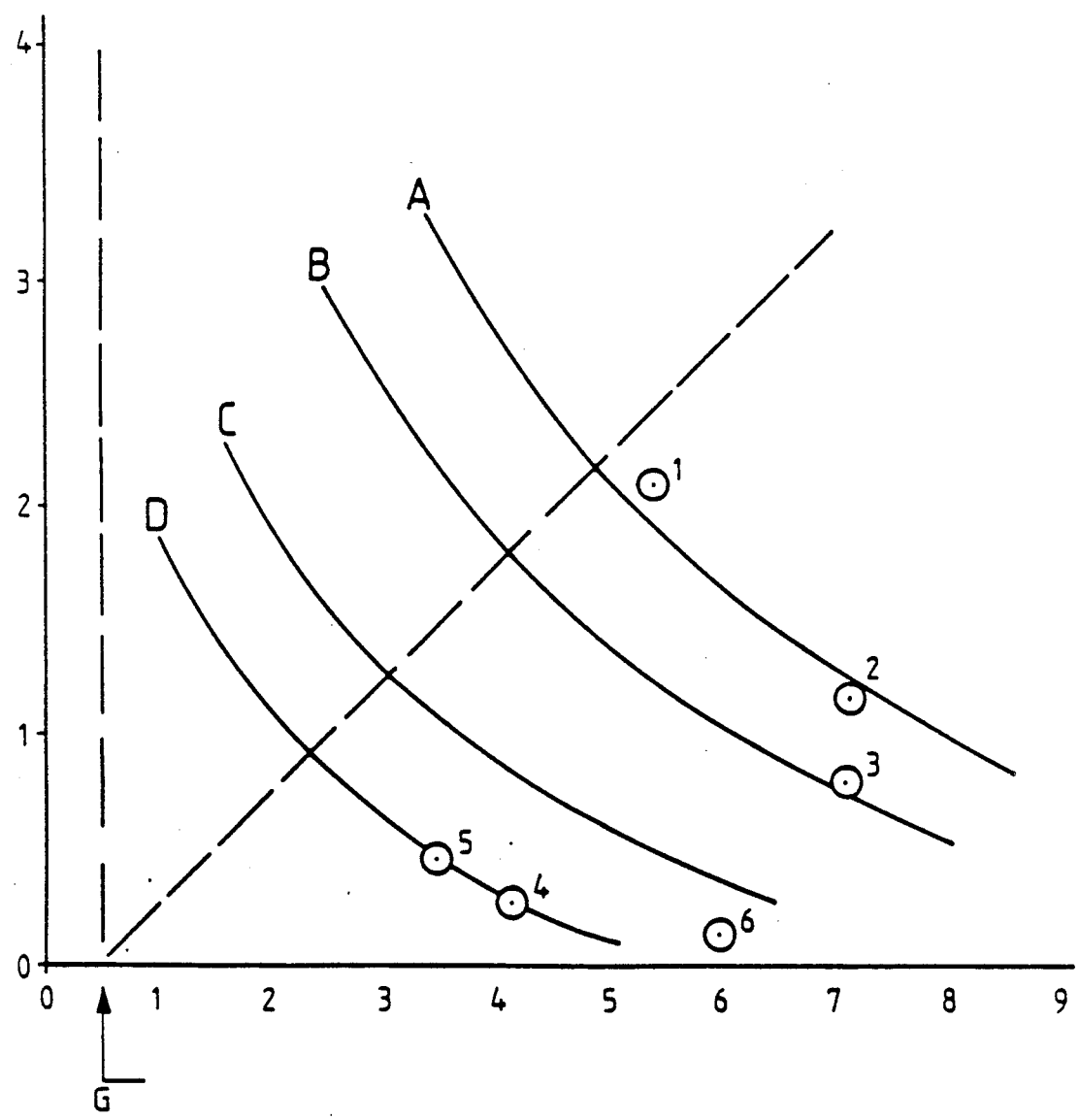

The hyperbolic sections A to D in FIG. 2 correspond to increasing quality of gasification The points are the measurements of Examples 1 to 6:

| | |
|---|---|
| (1) 10 t/h of steam | |
| (2) 10 t/h of steam | → two-stream burner |
| (3) 12 t/h of steam | |
| (4) 10 t/h of steam | |
| (5) 10 t/h of steam | → three-stream burner according to the novel process |
| (6) 12 t/h of steam | |

We have found that, with conventional two-stream burners, the quality of gasification defined above becomes markedly poorer both at low load and at normal load with the use of oils having a relatively high viscosity and in particular with the use of residue oils containing very small amounts of readily volatile components. Only when relatively large amounts of oxygen and steam are used is it possible to keep the amount of carbon black produced within acceptable limits. This is particularly important when it is desired to avoid the expensive recycling of carbon black to the feed fuel and to transport the carbon black washwater to another treatment.

The novel positioning of the steam feed into the liquid fuel close to the outlet orifice, and the mixing of the steam with the oil via a nozzle at a critical pressure drop of 30 to 250%, preferably from 80 to 140%, lead to a surprising improvement in the quality of gasification With very little steam and very little excess oxygen, a synthesis gas is obtained which has a very low $CO_2$ content and little carbon black as a byproduct, i.e. the quality of gasification increases sharply.

We have furthermore found that it is also possible to let down only some of the necessary moderating steam into the oil stream and then to add the remaining part of the moderating steam to the oxygen or to the fuel. It is thus possible for the amount of steam let down into the oil via the nozzles to be kept so small that it is sufficient at part load. At normal load, the additional moderating steam required is added via the oxygen.

The novel process thus combines the advantages of the favorable gasification conditions with the advantage of great flexibility in the reactor load. However, higher yields are obtained even in the gasification of relatively highly viscous residue oils which have a low content of volatile components.

A positive side effect of the novel process is that the solid particles always obtained in the partial oxidation process are substantially smaller. There is therefore likely to be less wear in the downstream waste heat system.

EXAMPLE 1

In a synthesis gas generator operated under 40 bar, 10 t/h of a high boiling vacuum residue is introduced via a two-stream burner, the oil is predispersed with 2.8 t of steam under 70 bar ($=0.28$ t of steam/t of oil) in a static mixer and then atomized with 8,050 m$^3$ (S.T.P.)/h of oxygen, with which 0.5 t/h of steam has been mixed (0.05 t of steam/t of oil), and reacted at 1400° C. After cooling, the cleavage gas has a $CO_2$ content of 5.4% and a carbon black content of 1.9 kg of carbon per 100 g of starting oil (Point 1 in FIG. 2).

EXAMPLE 2

In a synthesis gas generator operated under the same conditions as in Example 1, 10 t/h of vacuum residue are introduced but the oil is predispersed with a larger amount of 3.91 t of steam under 70 bar, i.e. 0.39 t of steam/t of oil, and reacted with a correspondingly larger amount of oxygen, with which 0.5 t/h of steam is likewise mixed. The cooled cleavage gas contains 7.1% of $CO_2$ and 1.17 kg of carbon per 100 g of starting oil (Point 2 in FIG. 2). It can be seen that higher $CO_2$ values, due to more steam and more oxygen, give rise to lower carbon black values at the same load.

EXAMPLE 3

12.5 t/h of vacuum residue are gasified under the same conditions as in Examples 1 and 2, i.e. at a 25% higher load and with the same nozzle arrangement. The oil is predispersed as in Example 2, with 4.8 t/h of steam under 70 bar, i.e. more than 0.39 t of steam/t of oil, and then gasified with 10,000 m$^3$ (S.T.P.)/h of oxygen with which 0.4 t/h of steam has been mixed. The cooled cleavage gas contains 7.1% of $CO_2$ and 0.8 kg of carbon per 100 kg of oil used (Point 3, FIG. 1). It can be seen that the higher load results in an increase in the quality of gasification with otherwise identical process parameters.

EXAMPLE 4

In the same synthesis gas generator as that used in Example 1, a nozzle according to FIG. 1 is installed. The orifice of the steam nozzle ends 2 mm, in the direction of flow, before the oil pipe connection. The steam pressure before the nozzle is 100 bar, i.e. 2.5 times the reactor pressure, which corresponds to about 135% of the critical pressure difference. 10 t/h of vacuum residue are gasified with 2.66 t/h of steam via the nozzle (0.27 t of steam/t of oil) with the addition of 7,900 m$^3$/h of oxygen, to which a further 1.1 t of steam (0.11 t of steam/t of oil) are added.

The cooled cleavage gas contains 4.2% of $CO_2$ and 0 25 kg of carbon in the carbon black per 100 kg of oil used (Point 4 in FIG. 2). It can be seen that a considerably smaller amount of carbon black is formed with substantially lower $CO_2$ values. In this case, the carbon black contains 21% of slag, i.e. there are only 3.8 kg of carbon per kg of slag whereas in Examples 1 to 3 about 15–25 kg of carbon were obtained per kg of slag. Recycling of carbon black can be dispensed with.

EXAMPLE 5

Under the same conditions as in Example 4, 10.5 t of vacuum residue are gasified while passing the same amount of steam through the nozzle, i.e. 2.64 t/h of steam under 100 bar. The amount of steam, based on the oxygen, is slightly reduced to 1.0 t/h, i.e. 0.09 t of steam/t of oil.

After cooling, the cleavage gas contains 3.5% of $CO_2$ and 0.42 kg of carbon black per 100 kg of oil. Point 5 in FIG. 2 shows that the use of less steam and oxygen leads to smaller amounts of $CO_2$ and larger amounts of carbon black.

EXAMPLE 6

Under conditions otherwise identical to those in Examples 4 and 5, 7 t/h of vacuum residue (30% less) are gasified with a correspondingly smaller amount of oxygen, to which an amount of only 0.08 t of steam (=0.01 t of steam/t of oil) is added. This means that the entire amount of moderating steam of 2.64 t/h, i.e. 0.38 t of steam/t of oil (as in Examples 2 and 3), is let down via the nozzle. These gasification conditions are so advantageous that it is possible to manage with a smaller specific amount of oxygen than in Examples 2 and 3. The cooled cleavage gas contains 6% of $CO_2$ and 0.25% of carbon in the carbon black per 100 kg of oil used (Point 6 in FIG. 2). It can be seen that the larger specific amount of steam per t of oil, resulting from the constant amount of steam at a fixed nozzle cross-section with a partial oil load (−30%), gives rise to the formation of more $CO_2$, but that, owing to the substantially better quality of gasification when the novel process is used, an extremely small amount of carbon results in the gas.

We claim:

1. In a process for the preparation of a synthesis gas by partial autothermal oxidation of a liquid or solid fuel in the presence of oxygen or an oxygen-containing gas with the addition of a gaseous temperature moderator selected from the group consisting of steam and $CO_2$ and mixtures thereof, in an empty reactor space without baffles, at from 1000° to 1500° C. under from 1 to 100 bar, the improvement which comprises:

feeding said fuel and oxygen-containing gas separately via feed pipes through concentrically arranged orifices opening into the reactor while feeding in the moderator gas simultaneously with the feed of the fuel and letting down the pressure of said moderator gas through one or more nozzles into the fuel stream at a point flush with or directly before the orifice for the fuel, said let-down being effected at from 30 to 250%, of the critical pressure ratio of said moderator gas.

2. A process as claimed in claim 1, wherein for full or part load, the same amount of moderator gas is always allowed to flow out without regulation by upstream control elements, and the nozzle orifices in each case are dimensioned such that, in the case of part load, a total mount of moderator gas required for carrying out the process flows through the nozzle and, in the case of full load, the additional amount of moderator gas required is added to the oxygen or to the fuel.

3. A process as claimed in claim 1, wherein the point at which the moderator gas is fed into the fuel stream is located not more than five times the diameter of the feed pipe for the fuel directly before the fuel orifice.

4. A process as claimed in claim 1, wherein said let down is effected at from 80 to 140% of the critical pressure ratio of said moderator gas.

5. A process as claimed in claim 1, wherein the moderator gas consists predominantly of steam.

6. A process as claimed in claim 2, wherein the moderator gas consists predominantly of steam.

7. A process as claimed in claim 2, wherein the part load represents at least 60% of the full load of moderator gas.

8. A process as claimed in claim 7, wherein the moderator gas consists predominantly of steam.

* * * * *

UNITED STATES PATENT AND TRADEMARK OFFICE
CERTIFICATE OF CORRECTION

PATENT NO. : 4,999,029
DATED : March 12, 1991
INVENTOR(S) : Gero Lueth, et al

It is certified that error appears in the above-identified patent and that said Letters Patent is hereby corrected as shown below:

Title Page:

Item [73] Assignee: should read --BASF Aktiengesellschaft--.

Column 2, lines 3 and 4, change the formual to show that the second bracketed expression is an exponent of the first bracketed expression:

$$-- \left(\frac{2}{x+1}\right)^{-\left(\frac{x}{x-1}\right)} --.$$

Column 6, line 20, claim 2, change "mount" to --amount--.

Signed and Sealed this

Seventeenth Day of November, 1992

Attest:

DOUGLAS B. COMER

Attesting Officer

Acting Commissioner of Patents and Trademarks